(12) United States Patent
McAndrew, III

(10) Patent No.: US 9,155,981 B2
(45) Date of Patent: Oct. 13, 2015

(54) LIQUID SETTLING SYSTEMS AND METHODS

(71) Applicant: Willard G. McAndrew, III, Plano, TX (US)

(72) Inventor: Willard G. McAndrew, III, Plano, TX (US)

(73) Assignee: Torchlight Energy Resources, LTD., League City, TX (US)

( * ) Notice: Subject to any disclaimer, the term of this patent is extended or adjusted under 35 U.S.C. 154(b) by 247 days.

(21) Appl. No.: 13/912,369

(22) Filed: Jun. 7, 2013

(65) Prior Publication Data

US 2013/0327724 A1  Dec. 12, 2013

Related U.S. Application Data

(60) Provisional application No. 61/656,689, filed on Jun. 7, 2012.

(51) Int. Cl.
  *B01D 21/02* (2006.01)
  *B01D 21/00* (2006.01)
  (Continued)

(52) U.S. Cl.
  CPC .......... *B01D 21/003* (2013.01); *B01D 21/0003* (2013.01); *B01D 21/0042* (2013.01); *B01D 21/0072* (2013.01); *B01D 21/2405* (2013.01); *B01D 21/2483* (2013.01); *C02F 1/00* (2013.01);
  (Continued)

(58) Field of Classification Search
  CPC ........... B01D 21/0003; B01D 21/0006; B01D 21/003; B01D 21/0033; B01D 21/0042; B01D 21/0072; B01D 21/2405; B01D 21/2483; B01D 2221/04; C02F 2001/007; C02F 2103/10

USPC ................. 210/747.1, 776, 800, 803, 170.01, 210/170.04, 521, 532.1, 540
See application file for complete search history.

(56) References Cited

U.S. PATENT DOCUMENTS

| 866,094 | A | * | 9/1907 | Vial .......................... 210/532.1 |
| 2,196,119 | A | | 4/1940 | Mitchell |
| 2,314,542 | A | | 3/1943 | Kern |

(Continued)

FOREIGN PATENT DOCUMENTS

| CA | 242413 A | 8/1924 |
| GB | 218363 | 6/1924 |

(Continued)

OTHER PUBLICATIONS

"Clarifier." http://catalogs.indiamart.com/products/clarifier.html.

(Continued)

*Primary Examiner* — Christopher Upton
(74) *Attorney, Agent, or Firm* — Banner & Witcoff, Ltd.

(57) ABSTRACT

A system and method for filtering sediment from water prior to disposal. According to some aspects, water is provided to a trough which feeds a settling pool via a port. The settling pool may comprise one or more blocks disposed in one or more corresponding channels which restricts flow of the water. In some embodiments, this restriction of flow may cause sediment to collect on a bottom of the settling pool and/or residual oil to collect on a surface of the water. The residual oil may be pumped or skimmed from the surface and the water may be pumped from the settling pool into one or more external holding tanks. The one or more blocks may then be removed from the settling pool and the sediment may be collected via a frontloader or other device accessing the sediment via an access ramp formed in the settling pool.

20 Claims, 5 Drawing Sheets

(51) Int. Cl.
*C02F 1/00* (2006.01)
*B01D 21/24* (2006.01)

(52) U.S. Cl.
CPC ....... *B01D 2221/04* (2013.01); *C02F 2001/007* (2013.01)

(56) References Cited

U.S. PATENT DOCUMENTS

| | | | |
|---|---|---|---|
| 2,489,661 A | | 11/1949 | Munro, Jr. |
| 2,585,719 A | | 2/1952 | Alvord |
| 2,782,929 A | * | 2/1957 | Colket ............ 210/540 |
| 3,365,060 A | | 1/1968 | Hsu |
| 4,054,520 A | | 10/1977 | McGivern |
| 4,127,488 A | | 11/1978 | Bell et al. |
| 4,137,173 A | | 1/1979 | Jarvis et al. |
| 4,341,643 A | | 7/1982 | Brodoff |
| 4,515,607 A | | 5/1985 | Wolde-Michael |
| 5,184,365 A | | 2/1993 | Stafford |
| 5,244,569 A | * | 9/1993 | Di Amico ............ 210/170.01 |
| 5,558,780 A | * | 9/1996 | Vancas ............ 210/532.1 |
| 5,707,512 A | | 1/1998 | Koch et al. |
| 5,707,535 A | | 1/1998 | Harris |
| 5,904,855 A | | 5/1999 | Manz et al. |
| 6,059,977 A | | 5/2000 | Rowney et al. |
| 6,207,057 B1 | * | 3/2001 | White ............ 210/803 |
| 6,391,195 B1 | | 5/2002 | Layton |
| 6,409,914 B1 | | 6/2002 | Keppeler et al. |
| 6,863,809 B2 | | 3/2005 | Smith et al. |
| 6,966,984 B1 | * | 11/2005 | Solomon ............ 210/521 |
| 7,226,242 B2 | * | 6/2007 | LeBuffe ............ 210/170.01 |
| 7,431,846 B2 | | 10/2008 | Palmer |
| 7,771,594 B2 | | 8/2010 | Ralph et al. |
| 7,943,040 B2 | | 5/2011 | Taylor et al. |
| 7,972,501 B2 | | 7/2011 | Godlien |
| 7,972,518 B2 | | 7/2011 | Ralph et al. |
| 8,839,963 B2 | * | 9/2014 | Torres-Collazo ............ 210/521 |
| 2002/0113014 A1 | | 8/2002 | Stroup |
| 2003/0200992 A1 | | 10/2003 | Goldman |
| 2006/0060539 A1 | | 3/2006 | Anthony |
| 2006/0086676 A1 | | 4/2006 | Smith |
| 2007/0017862 A1 | | 1/2007 | Shaver |
| 2008/0053484 A1 | | 3/2008 | Smith |
| 2008/0251465 A1 | * | 10/2008 | Ralph et al. ............ 210/521 |

FOREIGN PATENT DOCUMENTS

| | | |
|---|---|---|
| GB | 245476 A | 7/1927 |
| GB | 285944 A | 2/1928 |
| IE | 20060271 A1 | 9/2009 |
| JP | 2011005370 A | 1/2011 |
| RU | 2145903 C1 | 2/2000 |

OTHER PUBLICATIONS

"Inclined Plate Clarifiers." http://catalogs.indiamart.com/products/inclined-plate-clarifiers.html.
"Inclined Plate Sedimentation Tank in the Integration of the Role of the Oxidation." http://eng.hi138.com/?i58327.
"Liquid-Solid Separation."
"Settling of Solid Suspensions Under and Between Inclined Surfaces." http://pubs.acs.org/doi/pdf/10.1021/i260053a006.
"Solid-Liquid Separation Systems," Effluent and Manure Management Database for the Australian Dairy Industry. Dec. 2008.

* cited by examiner

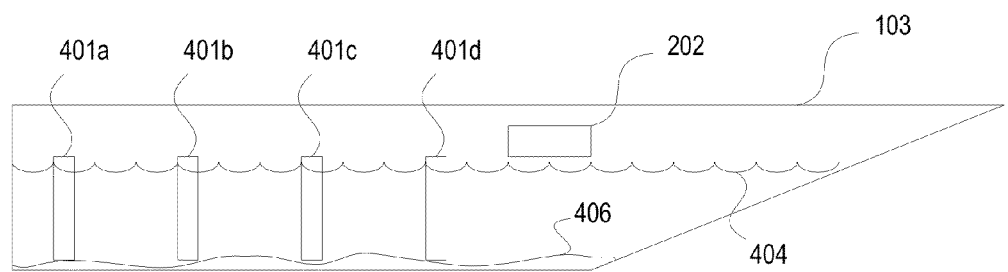
*FIG. 4*
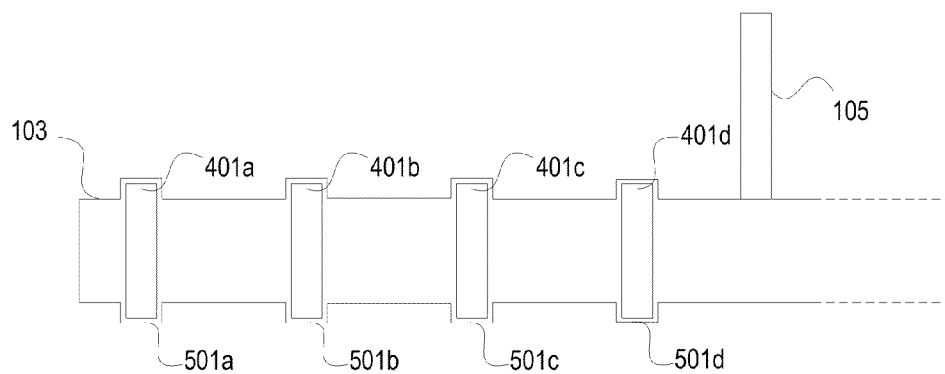
*FIG. 5*
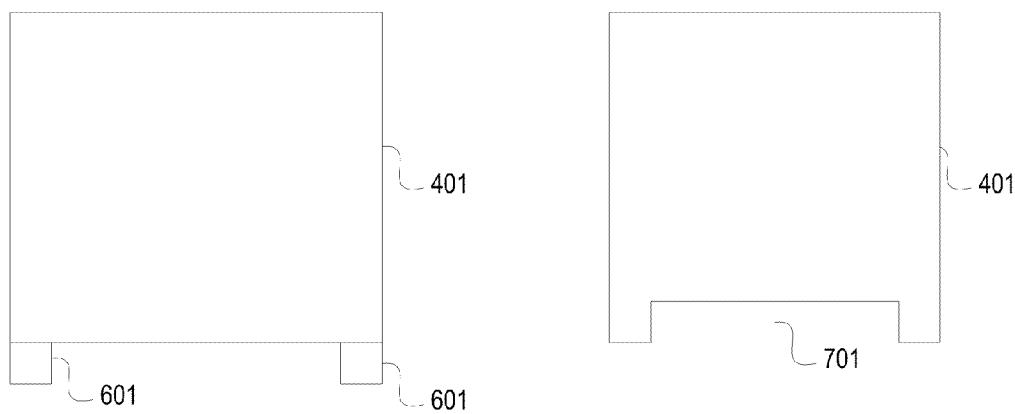
*FIG. 6*  *FIG. 7*

LIQUID SETTLING SYSTEMS AND METHODS

CROSS-REFERENCE TO RELATED APPLICATIONS

This application claims the benefit of U.S. Provisional Application No. 61/656,689, filed Jun. 7, 2012, the entire contents of which are hereby incorporated by reference.

FIELD

The invention relates generally to saltwater disposal systems. More specifically, the invention provides systems, methods, apparatuses, and techniques for filtering sediment from water prior to disposal of the water in order to minimize the harmful impact of impurities on the water disposal system.

BACKGROUND

Oil and gas reservoirs are usually found in porous rocks, which also contain saltwater. This saltwater, which accompanies the oil and gas to the surface, can be disposed in two ways: 1) Returned by fluid injection into the reservoir where it originated for secondary or enhanced oil recovery; or 2) Injected into underground porous rock formations not productive of oil or gas, and sealed above and below by unbroken, impermeable strata. Saltwater disposal wells use this second method to manage and dispose of saltwater. Saltwater produced by a reservoir typically also includes sediment and impurities that can harm a saltwater disposal system, e.g., by clogging valves, expediting normal wear and tear on parts, and otherwise damage fluid processing systems.

BRIEF SUMMARY

Aspects described herein provide methods, systems, apparatuses and techniques for purifying saltwater prior to the saltwater entering the disposal system. According to one aspect, a sediment separation system is provided which comprises a trough, a settling pool, one or more removable blocks configured to be housed within one or more corresponding channels in the settling pool, a vehicle access ramp to the settling pool, and a liquid inlet port, wherein the trough is arranged to receive a liquid and direct the liquid to the settling pool via the liquid inlet port.

According to other aspects, a method for separating sediment from a liquid is provided, wherein the method comprises providing a liquid to a trough, wherein the liquid in the trough flows, via a port, to a settling pool, settling the liquid in the settling pool using one or more blocks, wherein the one or more blocks are configured to restrict flow of the liquid within the settling pool such that the sediment settles along a bottom of the settling pool, pumping the liquid from the settling pool to one or more liquid holding tanks, removing the one or more blocks from the settling pool, and accessing the sediment from the settling pool via a vehicle access ramp of the settling pool.

According to yet another aspect, a system for separating sediment from water prior to the water entering a disposal system is provided, wherein the system comprises a trough covered by a grate, one or more shallow grade inclines flanking the trough and configured to direct water through the grate and into the trough, a settling pool comprising a ramp and one or more channels configured to removably receive one or more corresponding blocks such that the one or more blocks are suspended above a bottom of the settling pool, a water inlet comprising a pump, an external holding tank connected to the water inlet, and a port provided at an end of the trough and configured to direct the water from the trough to the settling pool, wherein the one or more blocks are configured to separate sediment contained within the water such that the sediment collects on the bottom of the settling pool beneath the one or more blocks, and wherein the ramp is configured to allow access to the settling pool in order to remove the sediment collected on the bottom of the settling pool once the water is pumped into the external holding tank via the water inlet and once the one or more blocks are removed from the one or more channels.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 4 illustrates a cross section of a settling pool according to aspects described herein.

FIG. 5 illustrates a top plan view of a portion of a settling pool according to aspects described herein.

FIG. 6 illustrates a settling block with footers according to aspects described herein.

FIG. 7 illustrates a settling block with recess cutout according to aspects described herein.

DETAILED DESCRIPTION

In the following description of various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention. The invention is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
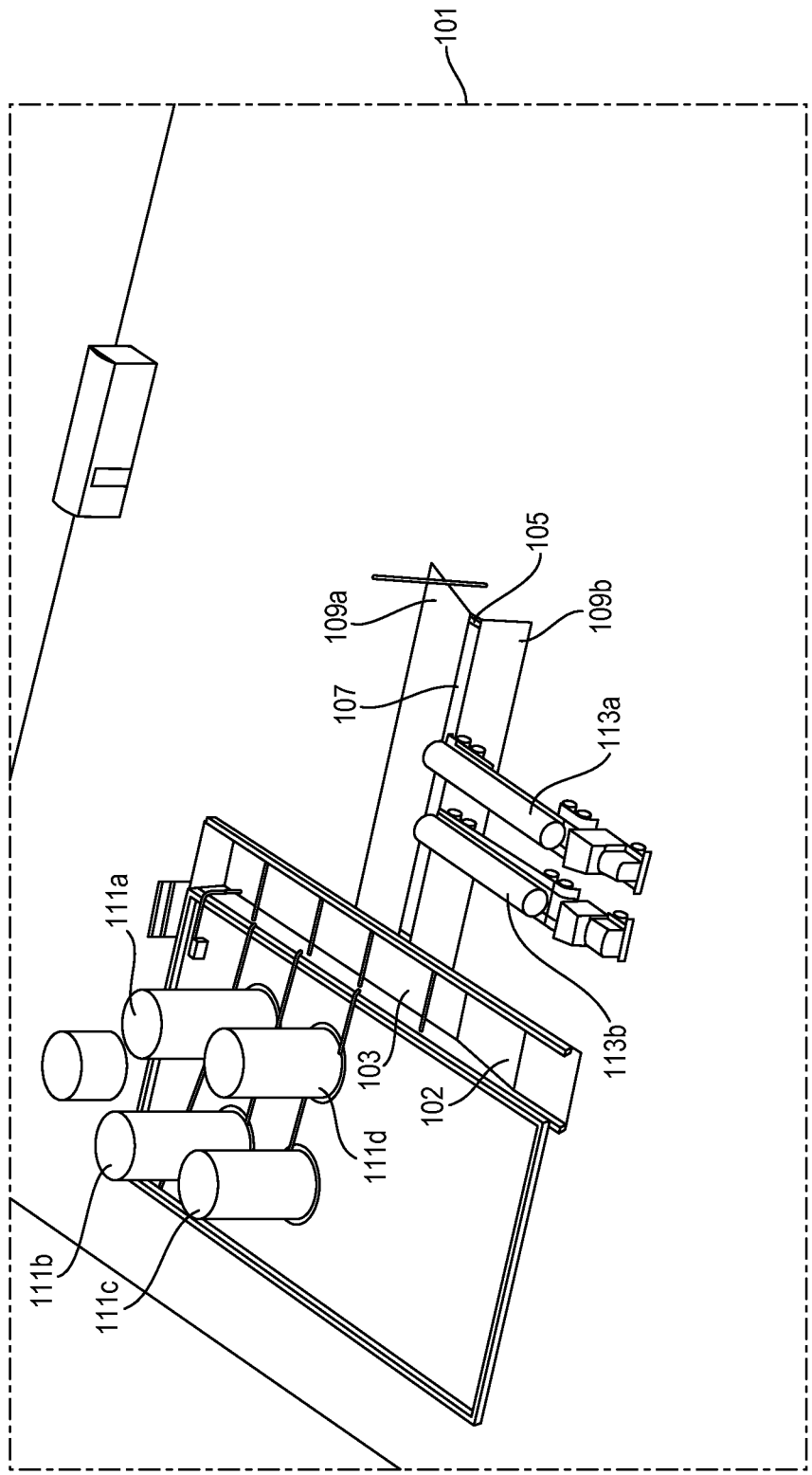
FIG. 1 illustrates a liquid settling system and operation according to aspects described herein.

FIG. 1 illustrates a saltwater disposal facility 101 according to aspects described herein. Facility 101 may include a primary settlement pool 103 fed by a trough 105. Unloading trough 105 may be covered by a grate 107 allowing for tanker trucks 113*a*, 113*b* to drive across trough 105. Trough 105 may be flanked by shallow grade incline 109*a*, 109*b*, so that any saltwater not emptied directly into trough 105 will still flow down into trough 105. Pool 103 may include a ramp 102 on one or either end, thereby allowing vehicle access to pool 103 as further described below.

Figure 2:
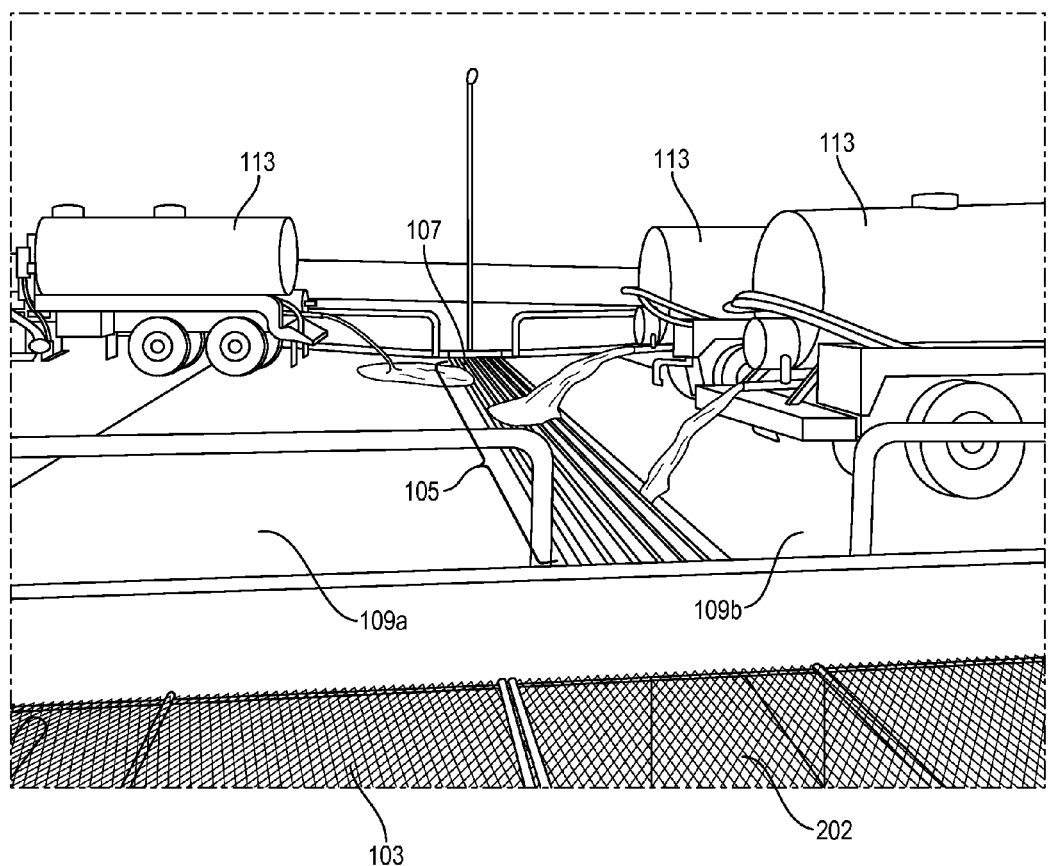
FIG. 2 illustrates a loading trough according to aspects described herein.

FIG. 2 illustrates an alternate view of trough 105 covered by grate 107 and feeding into primary pool 103 at port 202. In FIG. 2, pool 103 is shown covered by optional grating for security and safety purposes.

Figure 3:
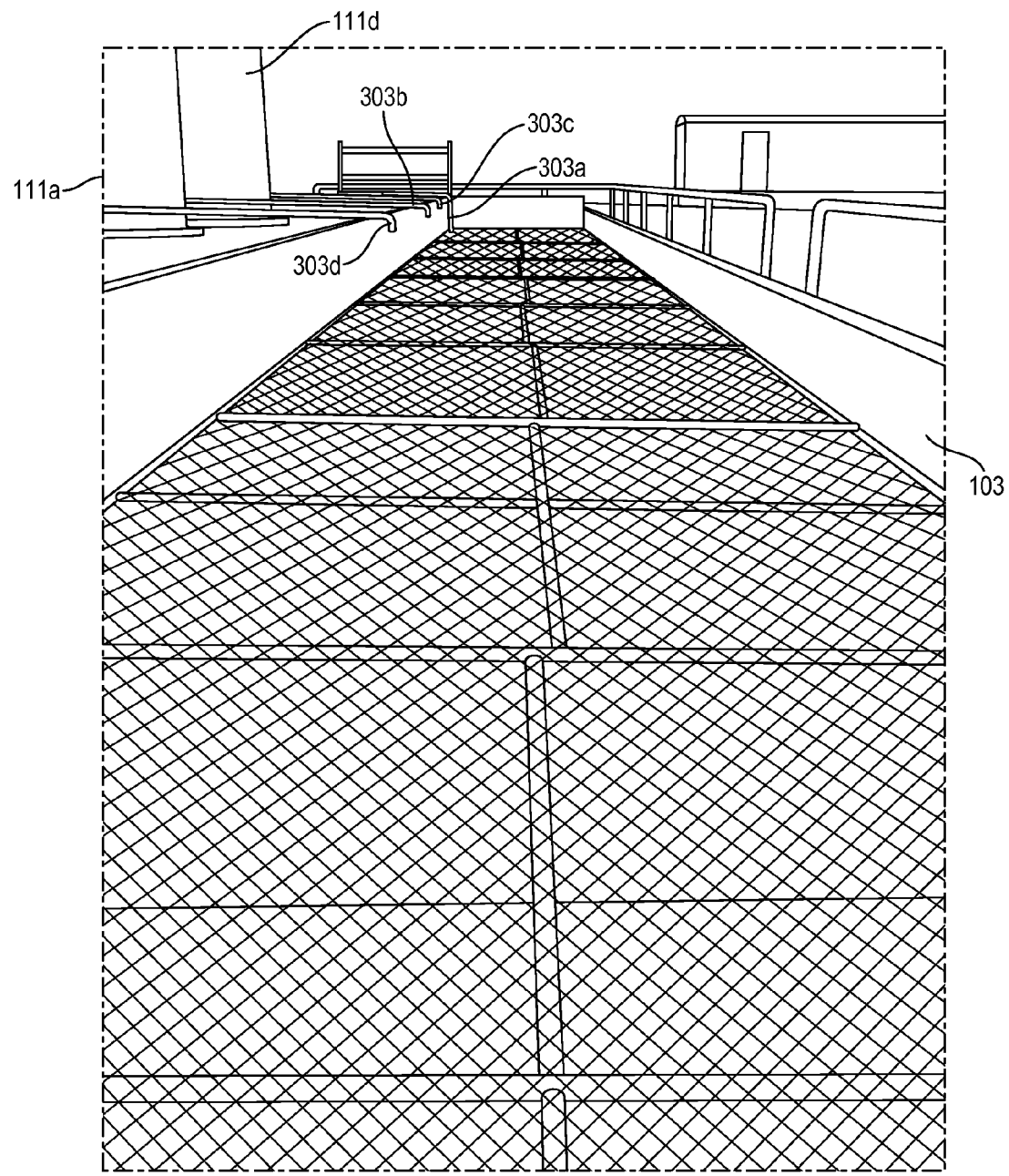
FIG. 3 illustrates a settling pool according to aspects described herein.

FIG. 3 illustrates another alternate view of primary pool 103 fed by tough 105 through port 202, and further illustrating water intakes 303*a-d* feeding tanks 111*a-d*, respectively. That is, each of water intake 303*a-d* is connected to a water pump to draw water from primary pool 103 into one or more of tanks 303*a-d*.

FIG. 4 illustrates a cross section of primary pool 103 filled with liquid (e.g., saltwater for disposal) 404. FIG. 5 illustrates a partial top plan view of pool 103. Settling blocks 401*a-d* may be placed within pool 103 to slow the flow of liquid 404 as the liquid 404 enters pool 103 from trough 105 through port 202. Blocks 401 may each be held in place via corresponding channels 501*a-d* cut into the wall of pool 103. While FIG. 4 and FIG. 5 illustrate four blocks 401 and four corresponding channels 501, other numbers of blocks and channels may alternatively be used. Block 401 may be made of wood or any other suitable substance that still allows water to flow among the various regions of pool 103, albeit at a slower than otherwise normal flow rate as compared to a pool without blocks 401 or other obstructions. One or more of blocks 401 may or may not extend all the way to the bottom of the pool, thereby allowing for liquid 404 to flow around and/or underneath each block 401. For example, one or more channels 501 might not extend all the way to a floor of pool 103, thereby supporting/suspending the corresponding block above the floor of pool 103. Alternatively, as shown in FIG. 6 footings 601 may be placed within one or more channels 501 underneath block 401 to support/suspend the corresponding block 401 above the floor of pool 103. Footings may be of various heights to achieve a desired height of each block. In yet another alternative, as shown in FIG. 7, block 401 may be cut to include recess 701 of any desired height and/or width for liquid to flow. Recess 701 need not necessarily be at the bottom of block 401, but may alternatively be cut anywhere with respect to a particular block 401.

As blocks 401 slow the flow rate of liquid 404, sediment 406 and/or other physical impurities of liquid 404 settle to the floor of pool 103. Once settlement occurs, liquid 404 may be pumped out of pool 103 to holding tanks 111*a-d* via one or more intakes 303*a-d*. When pool 103 is sufficiently empty, an operator may drive a frontloader device (e.g., a Bobcat® M-Series loader) down ramp 102 to collect and remove sediment 406 from pool 103.

Figure 8:
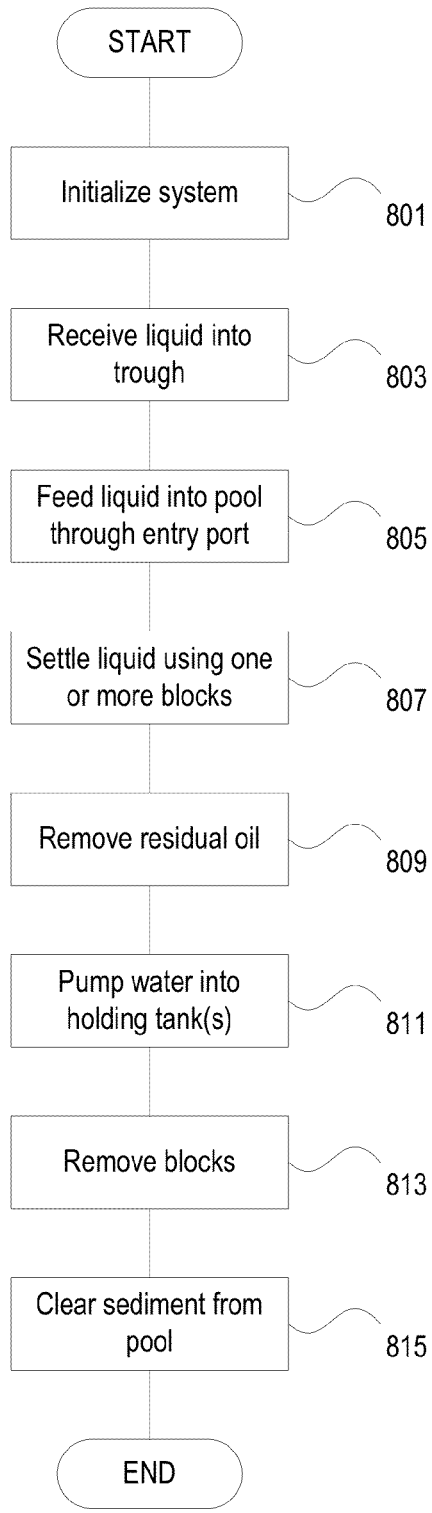
FIG. 8 illustrates a method for settling liquid according to aspects described herein.

FIG. 8 illustrates a flowchart for settling a liquid using the system described above. Initially, in step 801, the system is initialized by ensuring that pool 103 is substantially empty of liquid 404 and/or sediment 406, and that blocks 401 are placed within corresponding recesses 501. In step 803, liquid (e.g., saltwater, oil well disposal water, liquid 406, etc.) having sediment and/or other physical impurities is emptied into trough 105 via grate 107, e.g., from a tanker truck 113. In step 805 the liquid flows into pool 103 through port 202. In step 807 the liquid is slowed down by blocks 401, and settlement 406 falls to the floor of pool 103. Just as sediment 406 falls to the floor of the pool, residual oil may settle on the top of liquid 404. In step 809, residual oil may be skimmed, pumped, or otherwise removed from the top of liquid 404. In step 811 liquid 404 may be pumped into one or more holding tanks 111 via one or more intakes 303. In step 813, after the liquid is substantially removed from pool 103, blocks 401 may be removed to provide vehicular access to pool 103. In step 815, an operator may drive a vehicle, e.g., a front loader, into pool 103 via ramp 102 and remove the remaining sediment 406.

The system and methods described herein provide many advantages, including faster unloading times for tanker trucks because tanker trucks do not need to run hoses and/or connect directly to a water disposal pipe and/or pump. In addition, when liquid 404 is saltwater generated from oil drilling activities, residual oil can be more easily be separated from the saltwater (and sold for profit), and sediment can be recovered and resold and/or reused for future drilling activities. Yet another benefit is that less sediment is introduced into holding tanks, piping, pumps, and other mechanical portions of a saltwater disposal system, thereby reducing wear and tear on the system to reduce operation costs (i.e., less breakage, fewer repairs required, etc.).

Although the subject matter has been described in language specific to structural features and/or methodological acts, it is to be understood that the invention is not necessarily limited to the specific features or acts described above. Rather, the specific features and acts described above are disclosed as illustrative forms of implementing the ultimately claimed invention.

I claim:

1. A system for separating sediment from water prior to the water entering a disposal system, the system comprising:
    a trough covered by a grate;
    one or more shallow grade inclines flanking the trough and configured to direct water through the grate and into the trough;
    a settling pool comprising a ramp and one or more channels configured to removably receive one or more corresponding blocks such that the one or more blocks are suspended above a bottom of the settling pool;
    a water inlet comprising a pump;
    an external holding tank connected to the water inlet; and
    a port provided at an end of the trough and configured to direct the water from the trough to the settling pool, wherein the one or more blocks are configured to separate sediment contained within the water such that the sediment collects on the bottom of the settling pool beneath the one or more blocks, and wherein the ramp is configured to allow access to the settling pool in order to remove the sediment collected on the bottom of the settling pool once the water is pumped into the external holding tank via the water inlet and once the one or more blocks are removed from the one or more channels.

2. A sediment separation system comprising:
    a trough;
    a settling pool;
    one or more removable blocks configured to be housed within the settling pool;
    a vehicle access ramp to the settling pool; and
    a liquid inlet port, wherein the trough is arranged to receive a liquid and direct the liquid to the settling pool via the liquid inlet port.

3. A sediment separation system according to claim 2, wherein the trough is flanked by one or more shallow grade inclines arranged to direct the liquid into the trough.

4. A sediment separation system according to claim 2 further comprising a grate covering the trough.

5. A sediment separation system according to claim 2 further comprising one or more liquid intakes arranged to transfer the liquid from the settling pool into one or more external holding tanks.

6. A sediment separation system according to claim 2, wherein the one or more removable blocks are configured to be housed within one or more corresponding channels, and the one or more corresponding channels comprise recesses in walls of the settling pool arranged to hold the removable blocks in place.

7. A sediment separation system according to claim 2, wherein the removable blocks are configured to slow a flow rate of the liquid within the settling pool when placed in the settling pool.

8. A sediment separation system according to claim 2, wherein the one or more removable blocks rest upon footings that are arranged to prevent the blocks from extending to a bottom of the settling pool.

9. A sediment separation system according to claim 2, wherein the removable blocks comprise a recess configured to allow the liquid to flow through the recess.

10. A sediment separation system according to claim 2 further comprising a pump, wherein the pump is configured to remove oil settled on a top of the liquid in the settling pool.

11. A method for separating sediment from a liquid, the method comprising:
    receiving a liquid at a trough, wherein the liquid in the trough flows, via a port, to a settling pool;
    settling the liquid in the settling pool using one or more blocks, wherein the one or more blocks are configured to restrict flow of the liquid within the settling pool such that the sediment settles along a bottom of the settling pool;
    pumping the liquid from the settling pool to one or more liquid holding tanks;
    removing the one or more blocks from the settling pool; and
    accessing the sediment from the settling pool via a vehicle access ramp of the settling pool.

12. The method for separating sediment from a liquid of claim 11 further comprising, prior to providing a liquid to a trough, placing the one or more blocks in the settling pool.

13. The method for separating sediment from a liquid of claim 12, wherein the one or more blocks are placed in one or more corresponding channels provided in the settling pool.

14. The method for separating sediment from a liquid of claim 13 further comprising, suspending, via the one or more channels, the one or more blocks such that the liquid is able to flow below the one or more blocks.

15. The method for separating sediment from a liquid of claim 11 further comprising removing residual oil from a top of the liquid in the settling pool.

16. The method for separating sediment from a liquid of claim 11, wherein the accessing the sediment from the settling pool via a vehicle access ramp of the settling pool comprises removing the sediment from the settling pool using a frontloader device.

17. The method for separating sediment from a liquid of claim 16, wherein a user drives the frontloader device into the settling pool via the vehicle access ramp.

18. The method for separating sediment from a liquid of claim 11, further comprising providing one or more footings below each of the one or more blocks such that the liquid is able to flow beneath the one or more blocks.

19. The method for separating sediment from a liquid of claim 11 further comprising providing a recess in the one or more blocks such that the liquid is able to flow through the recess in the one or more blocks.

20. The method for separating sediment from a liquid of claim 11, wherein the liquid is provided to the trough via one or more tanker trucks.

\* \* \* \* \*